United States Patent
Neidhart

(10) Patent No.: US 7,218,027 B2
(45) Date of Patent: May 15, 2007

(54) HIGH-POWER DIRECT CURRENT ENGINE COMPRISING A COLLECTOR AND CARBON BRUSHES FOR A RACING CAR SERVING AS PROTOTYPE

(75) Inventor: Philippe Neidhart, Bernex (CH)

(73) Assignee: Team Orion Europe SA, Plan-Les-Ouates (SE)

( * ) Notice: Subject to any disclaimer, the term of this patent is extended or adjusted under 35 U.S.C. 154(b) by 39 days.

(21) Appl. No.: 10/491,390

(22) PCT Filed: Sep. 30, 2003

(86) PCT No.: PCT/CH03/00652

§ 371 (c)(1),
(2), (4) Date: Mar. 31, 2004

(87) PCT Pub. No.: WO2004/036722

PCT Pub. Date: Apr. 29, 2004

(65) Prior Publication Data

US 2005/0029895 A1     Feb. 10, 2005

(30) Foreign Application Priority Data

Oct. 15, 2002    (CH) .................................... 1715/02

(51) Int. Cl.
*H02K 13/00*   (2006.01)
*H01R 39/38*   (2006.01)
*H02K 5/00*    (2006.01)

(52) U.S. Cl. .................. 310/239; 310/68 R; 310/89
(58) Field of Classification Search ................ 310/239, 310/51, 89, 68 R
See application file for complete search history.

(56) References Cited

U.S. PATENT DOCUMENTS

| 985,951 | A | * | 3/1911 | Sparks ........................ 310/239 |
| 1,193,349 | A | * | 8/1916 | Bliss ........................... 310/241 |
| 2,991,379 | A | | 7/1961 | Van Dam |
| 4,110,651 | A | * | 8/1978 | Fagan ......................... 310/239 |
| 4,342,934 | A | * | 8/1982 | van Wijhe et al. .......... 310/239 |
| 4,344,009 | A | * | 8/1982 | Reynolds ..................... 310/242 |
| 4,413,200 | A | * | 11/1983 | Fenicle ....................... 310/239 |
| 5,006,744 | A | * | 4/1991 | Archer et al. ................ 310/89 |
| 5,099,781 | A | * | 3/1992 | Frank ........................... 118/52 |
| 5,252,869 | A | | 10/1993 | Gordin |
| 5,608,280 | A | | 3/1997 | Tamemoto et al. |
| 5,696,418 | A | | 12/1997 | Corbach et al. |
| 5,874,796 | A | * | 2/1999 | Petersen ................. 310/156.45 |
| 5,945,755 | A | * | 8/1999 | Ohmi et al. .............. 310/75 R |

(Continued)

FOREIGN PATENT DOCUMENTS

DE          1122 625          1/1962

(Continued)

*Primary Examiner*—Burton S. Mullins
*Assistant Examiner*—Erik Preston
(74) *Attorney, Agent, or Firm*—The Webb Law Firm

(57) ABSTRACT

A DC motor includes a rotor which is mounted in a housing so that it can rotate about an axis. The rotor includes at least one winding to which direct current is applied from the outside in alternating directions via a commutator, which is arranged on the rotor. Brushes are seated on the commutator and are mounted whereupon they can move relative to the commutator while being pushed by spring pressure onto the commutator.

4 Claims, 7 Drawing Sheets

U.S. PATENT DOCUMENTS

| | | |
|---|---|---|
| 6,188,154 B1 * | 2/2001 | Luedtke et al. ............ 310/68 C |
| 6,329,735 B1 * | 12/2001 | Tanaka et al. ............... 310/239 |
| 6,563,245 B1 * | 5/2003 | Suzuki et al. .................. 310/91 |
| 2003/0048025 A1 | 3/2003 | Vaucher |
| 2003/0071536 A1 * | 4/2003 | Kuhlmann-Wilsdorf .... 310/239 |
| 2003/0107273 A1 * | 6/2003 | Ikeda et al. .................... 310/43 |
| 2004/0169435 A1 * | 9/2004 | Winkler et al. .............. 310/239 |

FOREIGN PATENT DOCUMENTS

| | | | |
|---|---|---|---|
| EP | 260040 A | * | 3/1988 |
| FR | 886 865 A | | 10/1943 |
| FR | 2 723 481 A | | 2/1996 |
| GB | 2 154 375 A | | 9/1985 |
| JP | 07-194067 A | | 7/1995 |
| WO | WO 01/69760 A1 | | 9/2001 |

\* cited by examiner

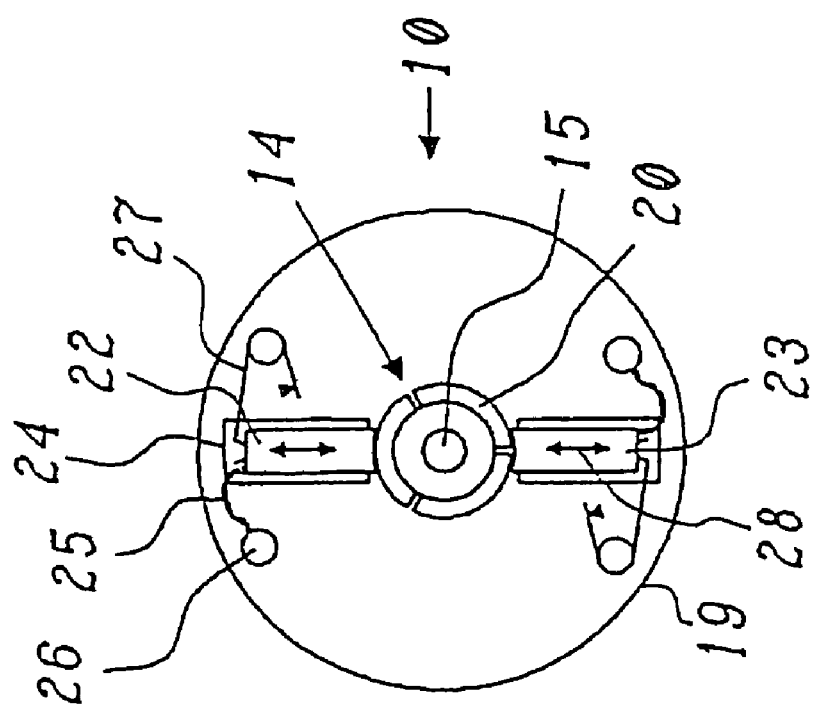
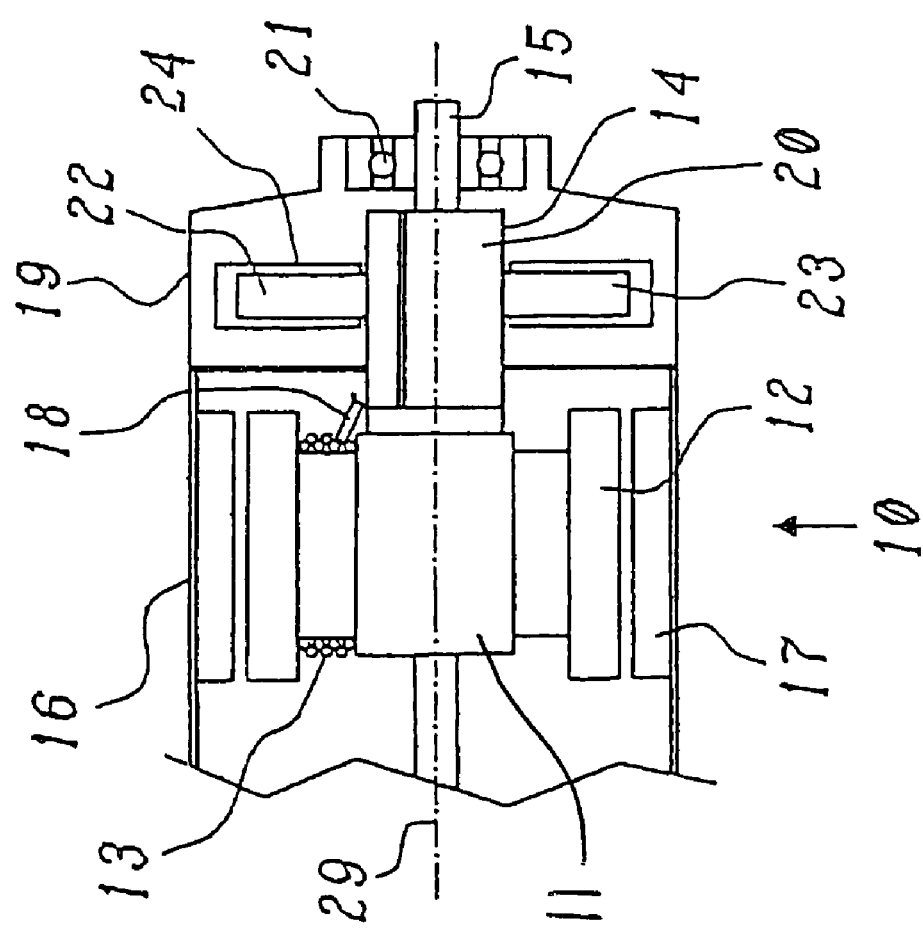
Fig 1A (PRIOR ART)
Fig 1B

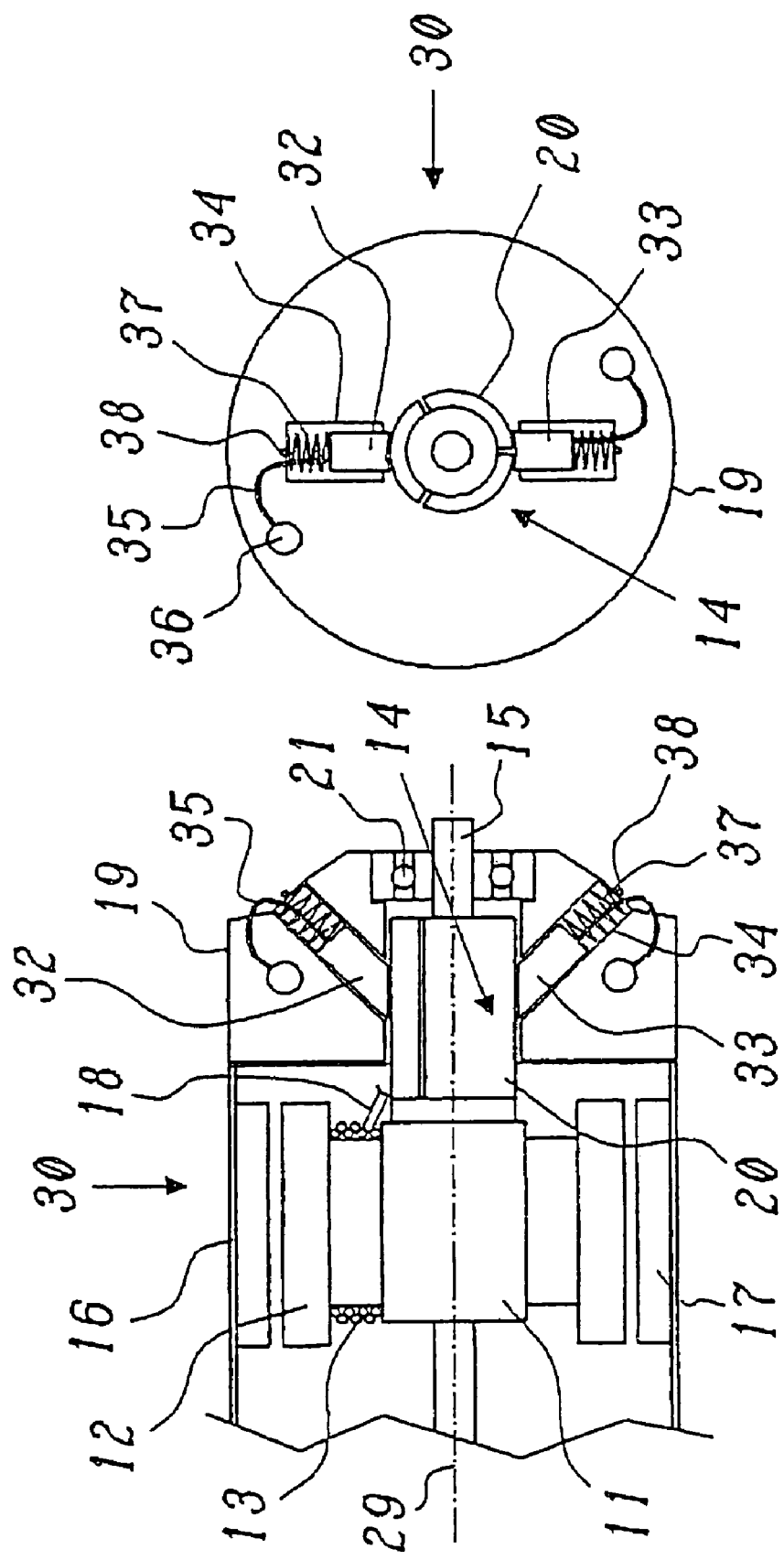

HIGH-POWER DIRECT CURRENT ENGINE COMPRISING A COLLECTOR AND CARBON BRUSHES FOR A RACING CAR SERVING AS PROTOTYPE

BACKGROUND OF THE INVENTION

1. Technical Field

The present invention relates to the field of DC motor technology. It relates in particular to a high-power DC motor, especially for model racing vehicles.

2. Prior Art

Small, extremely high-power DC motors which rotate at a high speed are used nowadays for driving battery-powered model racing cars, model boats or model aircraft. Examples of such high-power DC motors for model racing cars are the RC2140 or RC2141 types from the American company Trinity Products, Inc. Edison, N.J. (USA), or the "Chrome Touring" series of motors from the Swiss company Team Orion Europe SA, 1233 Bernex, Switzerland. FIGS. 1A and 1B show an example of the design of such DC motors from the prior art in simplified form and in the form of a detail, with the figure element 1A showing a longitudinal section through the motor and the figure element 1B showing a plan view in the axial direction of the motor head. The DC motor 10 shown in FIGS. 1A and 1B has a housing 16 with magnets 17 (the fixed part) which are arranged on the inside, and in which a rotor 11 (the rotating part of the motor) is mounted such that it can rotate about an axis 29. The rotor 11 comprises a central shaft 15, an armature 12 with appropriate windings 13 and a commutator 14 (for the sake of simplicity, only one of the windings is shown).

The armature 12 is composed, in a known manner, of a material with high magnetic permeability. An electrical current flows through the windings 13, producing a magnetic field when the DC motor 10 is supplied with current, and with this magnetic field interacting with the magnets (permanent magnets) 17 on the housing 16. The commutator 14 is composed of individual electrically conductive commutator segments 20, normally made of metal, which are isolated from one another and are arranged on a cylindrical casing surface about the axis 29. The commutator segments 20 are electrically connected to the windings 13 via winding connections 18 in a predetermined manner. The commutator controls the time duration and direction of the current flow through the windings 13, such that the attraction and repulsion forces cause the rotor 11 to rotate depending on the magnetic field direction in the armature 12 and on the polarity of the magnets 17.

The housing 16 of the DC motor 10 is provided at both ends with sliding bearings, ball bearings 21 or similar bearings, which guide the central shaft 15 of the rotor 11. Furthermore, brush boxes 24 which extend in the radial direction and in which brushes 22, 23 are guided are arranged on opposite sides in the motor head 19 in which the commutator 14 is accommodated. Brushes 22, 23 may be composed of carbon. However, they may also be composed of a material other than carbon, in particular and also including a material mixture, for example of carbon, graphite, copper, silver or the like. The inner ends of the brushes 22, 23 are seated on the commutator 14 and in this way guide the current from the rigid part of the motor via the commutator 14 to the windings 13 of the rotor 11. The brushes 22, 23 are pressed against the commutator 14 by pressure springs 27, and are electrically conductively connected via current-carrying braids 25 to electrical connecting poles 26.

During operation of the DC motor 10, centrifugal forces act on the rotor and generally lead to the central shaft 15 no longer rotating centrally. The radial gap between the central shaft 15 of the rotor 11 and the bearings, in particular the gap in the ball bearings 21 allows the axis of the rotor 11 to be shifted radially and the rotor 11 not to rotate roundly. When sliding bearings are used, the gap increases as the sliding bearings wear.

Dynamic balancing of the rotor 11 only partially improves the situation. The shifting of the centre can also be caused by unequal magnetic forces. The drive force of the motor when the motor is installed is transmitted to other rotating parts. When power is drawn, a lever effect is produced which forces the rotor 11 against the bearing walls. The lever effect can become even greater during acceleration and braking. These forces vary over the course of operation of the motor and force the rotor 11 away from the ideal centre.

The uncentred rotation of the shaft 15 of the rotor 11 results in the commutator 14 not rotating centrally either, that is to say not running roundly. The brushes 22, 23 are forced against the commutator segments 20 by pressure springs 27. Thus, when the rotor 11 is not running roundly, the brushes 22, 23 have to follow the backward and forward movement of the commutator 14. At low rotation speeds, the brushes 22, 23 can follow this by moving backward and forward in the movement direction 28 in their brush boxes 24 (FIG. 1B), so that the contact between the brushes 22, 23 and the commutator segments 20 is always good.

However, as soon as the rotation speed rises, the brushes 22, 23 are knocked away in the movement direction 28 by the commutator 14, lift off the commutator 14 and do not make contact with the next commutator segment 20 again until later. The electrical contact is made with a time delay, and the power of the motor falls.

If the brushes 22, 23 do not slide smoothly from one commutator segment 20 to the next, the electrical contact is interrupted at times. The interruption and the renewed making of the contact lead to sparks being formed between the brushes 22, 23 and the commutator segments 20. These sparks burn the commutator segments 20. The commutator segments 20 are damaged, and the quality of the current transmission suffers and falls. The commutator 14 is worn away prematurely, and the power of the motor decreases permanently. The sparks and the damaged commutator segments 20 also increase the wear rate of the brushes 22, 23, and overheat them.

Sparks also form a heat source, so that the commutator segments are deformed and are worn away irregularly. This adversely affects the life of the motor, and reduces its power.

The sparks also cause radio interference and can interfere with remote control receiving systems, or even make them unusable, when motors such as these are operated in the vicinity of radio receivers.

It is already known from WO-A1-01/69760 or JP-A-07-194067 for the backward and forward movements of the brushes to be damped by using a damping substance (for example a thixotropic material) to guide the springs, which also move. It is also known for the movement of the brushes to be braked by mechanical friction, by a leaf spring pressing against the side of the brushes. Both the damping and the braking are symmetrical, that is to say they are of equal intensity in both movement directions of the brushes. Both the movement of the brushes away from the commutator and the movement of the brushes in the direction of the commutator are thus damped or braked. This damping (braking) thus delays the time at which contact is next made between the brushes and the commutator segments. No improvements can be achieved in this way. What is obtained on the one hand (when the brushes are lifting off the commutator) is made worse on the other hand (when the brushes are moving towards the commutator).

Furthermore, the current is normally passed via a current transmission braid (25 in FIG. 1B), which is fixed in the brush, to the brushes, and then through the brush to the commutator. Overall, this forms an electrical resistance. If this electrical resistance could be reduced, then the motor would produce more power The known solutions for damping and braking the backward and forward movement of the brushes do not allow any improvements whatsoever with regard to reducing the magnitude of the resistance.

U.S. Pat. No. 2,991,379 and the parallel DE-B-1 122 625 describe a brush holder for a servomotor, in which the longitudinal axes of the brushes in the brush boxes form an angle of about 45° with the motor axis. In order to avoid increased wear on the brushes and to achieve increased no-load rotation speeds without having to increase the brush pressure, it is proposed that the brushes be guided better in the brush boxes. For this purpose, according to one embodiment (FIGS. 1A and 1B), the brush boxes are designed to have a polygonal (square, hexagonal) cross section, such that the motor axis lies on the plane which passes through two opposite edges of the brush boxes. The brushes have a corresponding cross-sectional shape and are guided by two opposite longitudinal edges in the grooves formed by the corners in the brush holders. The use of the edges of the brushes for guidance results in a greatly reduced contact area between the brushes and the brush boxes, which on the one hand prevents effective friction damping of the brush movement, and on the other hand makes it more difficult to supply current to the brush tip via the brush box.

In a second embodiment of U.S. Pat. No. 2,991,379 (FIG. 2), the brush is guided in a guide element which is open on one side, is in the form of a rail and has a cross section in the form of a right angle. The spring which provides the brush with pressure is inclined with respect to the longitudinal axis of the guide element such that the brush is forced into the guide element, which is in the form of a groove, not only by the commutator forces but also by the opposing spring forces. This admittedly results in increased friction damping, but the friction damping is independent of the movement direction of the brushes.

U.S. Pat. No. 5,696,418 describes an electrical commutator machine in which the two brushes are arranged offset from the radial direction with respect to the machine axis. A special mounting is proposed for the brush boxes on a plate which surrounds the machine axis and is at right angles to the machine axis. The brush boxes, which are bent from sheet metal, have a rectangular cross section and are inserted into corresponding slots in the plate, and are secured, by means of lugs which project at right angles on the lower face. A spring tongue is formed (FIGS. 5, 6) in one side wall of the brush box, presses on the one side against the brush which is located in the brush box, and thus presses this against the opposite wall of the brush box. This pressure mechanism not only results in the brush being fixed in the box but also results in uniform friction on the opposite wall, which is independent of the movement direction of the brush.

Finally FR-A-2 723 481 discloses a brush holder for reversible commutator machines, in which two pairs of brush boxes are provided, which are each arranged offset from the radial direction with respect to the motor axis. The brush holder is produced from a plastic, as an injection-moulded part. The individual brush boxes have a square cross section and are provided at the corners with rails (42) which project inwards and in which the brushes are guided by their edges. The use of plastic for production of the holder and the specific nature of the edge bearing mean that the holder is not suitable for use in high-power motors, because the heat which is produced on the commutator cannot be effectively dissipated in the brushes, because the current cannot be passed directly into the front part of the brush and because this results in only a small amount of friction damping for the moving brush.

The solution to the problems which occur with the brushes in high-power DC motors for model racing cars is made very much worse by the fact that the existing regulations (for racing operation) mean that the motors are on the one hand subject to major restrictions with regard to the geometry (external dimensions) and electrical and mechanical design, and on the other hand have to achieve extreme power levels (rotation speed, acceleration time, torque, etc) at least over time periods of several minutes. The motors can in this case reach rotation speeds of up to 60 000 rpm, and draw a current of up to 120 A from the battery or rechargeable battery set, which is likewise subject to restrictions. The motor heads in which the brushes are arranged may in this case be heated up to 100° C. In the extreme, the brushes last for only a single race, which is only 5.5 minutes.

Racing with model racing cars which are driven electrically is subject to internationally applicable laws, the so-called ROAR (Remotely Operated Auto Racers) Rules, which specify, inter alia, the restrictions and boundary conditions applicable to electrical drives. The ROAR rules state that the motor must not have an external diameter of more than 36.02 mm and must not have a length of more than 53 mm, measured from the mounting plate at one end to the outermost point of the motor head. The diameter of the central shaft must be ⅛ inch. Only ceramic magnets are allowed. The commutator may have only three sectors. In the same way, a specific number of turns are specified. Based on specific basic motor types, technical changes may be made to the motors within the rules, with such changes having a different scope depending on the motor class. In this case, a distinction is drawn between so-called stock motors, rebuildable stock motors, and modified motors. The most extensive changes which also include, in particular, changes to the brushes and to the internal design of the motor, may be made in the last-mentioned motor class. However, owing to the extreme space restriction, the brushes can be modified only with major difficulties.

SUMMARY OF THE INVENTION

The invention is a high-power DC motor with a commutator and brushes for model racing vehicles, in particular model racing cars, which avoids the disadvantages of known DC motors and, in particular, counteracts a reduction in the motor power owing to the movement of the brushes at high rotation speeds, and at the same time allows the electrical resistance in the power supplies to the commutator to be reduced.

The essence of the invention is to introduce means by which the movement of the brushes against the spring pressure is damped or braked, while the movement of the brushes with the spring pressure remains largely uninfluenced. This prevents or suppresses the brushes being knocked away by the rotating commutator segments while, once a brush has been knocked away, it is moved back again into contact with the commutator segments quickly, by the spring pressure, without any impediments.

One embodiment of the invention is characterized in that the brushes are each mounted in brush boxes such that they can slide in a movement direction which is predetermined by the brush boxes, and in that the movement direction of the brushes deviates from the radial direction with respect to the axis in such a way that the brushes in their brush boxes are subjected to increased sliding friction on at least one wall of the brush boxes during movement against the spring pressure caused by the commutator. When the commutator is exerting a repulsion force on the brushes, the brushes are pressed against the at least one wall of the brush boxes, owing to the oblique position of the brush boxes, and their movement in the box is impeded (braked, damped) by increased friction on the at least one wall. When the repulsion forces ends, the brushes are pressed back against the commutator by the spring force of the pressure springs without any traceable wall friction occurring.

The movement directions of the brushes each preferably include an angle ($\alpha$) in the range between 15° and 75° with the radial direction with respect to the axis. In particular, the angle ($\alpha$) is about 45°.

In a first alternative, the movement directions of the brushes lie on a common plane which passes through the axis of the DC motor. In particular, good accessibility to the brushes is in this context achieved in that the movement directions of the brushes are aligned obliquely outwards.

In a second alternative, the movement directions of the brushes lie on a common plane which is at right angles to the axis of the DC motor.

The design is particularly simple in this case if two brushes are provided and are arranged with respect to one another such that they can be transferred into one another by rotation through 180° about the axis of the DC motor.

A reduction in the resistance for the power supply and thus an improvement in the motor power is achieved in conjunction with increased friction on the brush boxes in that the walls of the brush boxes are composed of an electrically highly conductive material, in particular of a metal. The brush boxes form an electrically highly conductive bypass for the current, which can thus be passed with a reduced resistance directly to the tips of the brushes, which are seated on the commutator. It is particularly advantageous for the brush boxes to be conductively connected to appropriate apparatuses for supplying electrical current. It is particularly advantageous with regard to heat dissipation and the electrical supply for the walls of the brush boxes to be produced from copper.

The heat which is produced in the area of the commutator and of the brushes can be dissipated particularly quickly and reliably by the brush boxes being arranged in a motor head in the form of a shell, in that the motor head is made of a thermally highly conductive material, in particular of a metal, and in that the brush boxes are mounted in an electrically isolated manner in the motor head. It is particularly advantageous from the design point of view and on the basis of thermal aspects for the motor head to be composed of aluminium and for the brush boxes to be electrically isolated from the motor head by an anodized intermediate layer.

A further improvement in the heat dissipation can be achieved by the motor head having cooling ribs on the outer face, in order to improve the heat emission to the environment, with the cooling ribs preferably being formed concentrically with respect to the axis of the DC motor.

In addition to passive heat dissipation via the motor head and the brush boxes, effective active cooling can be achieved by providing ventilation channels in the motor head for supplying cooling air into the interior of the DC motor, by the winding of the DC motor being electrically conductively connected to the commutator via winding connections, with the winding connections being designed such that they act as fan vanes when the motor is running in the normal direction and suck in cooling air through the ventilation channels, and by the ventilation channels being in the form of helical lines.

In order to ensure that the rotor is borne precisely in an automatically adjusting manner and in order in this way to advantageously influence the formation of sparks on the commutator, it is advantageous for the central shaft (at the end at which the commutator is located) of the rotor to be mounted in a ball bearing such that it can rotate, and for the ball bearing itself to be mounted elastically. This is preferably designed such that the ball bearing is mounted elastically in the radial and axial directions, and such that the elastic bearing is produced by means of O rings which concentrically surround the ball bearing on the outside on the one hand, and are used to support the ball bearing in the axial direction on the other hand.

The assembly process is particularly simple, with improved spring characteristics at the same time, if pressure springs in the form of spiral springs which taper conically towards the brushes are provided in order to produce the spring pressure on the brushes, if the pressure springs are supported by their ends facing away from the brushes on an undercut in the brush boxes, and if the pressure springs are made of an INOX wire.

When the current levels to the motor are high, it is desirable for the cable runs for the current to be as short as possible, in order to minimize losses. This can be achieved in that the brush boxes each have an apparatus to which all of the lines coming from the outside for the respective pole can be electrically connected. The apparatus for connection of the lines which come from the outside is preferably in the form of a flange which surrounds the brush box and is preferably subdivided into two or more sectors.

The sparks which occur on the commutator form a radio interference source. In order to ensure effective suppression despite the confined spatial conditions for the model motor, a printed circuit board is arranged in the interior of the motor head and has a circuit for motor suppression, and the circuit board is electrically conductively connected to the brush boxes via contact springs which press against the brush boxes. In addition, an externally visible light-emitting diode may be arranged on the circuit board in order to check the rotation direction of the motor.

BRIEF DESCRIPTION OF THE DRAWINGS

The invention will be explained in more detail in the following text with reference to exemplary embodiments and in conjunction with the drawings, in which:

FIGS. 1A and 1B show a DC motor with a commutator and brushes according to the prior art, in a longitudinal section and a plan view from the front, respectively;

FIGS. 2A and 2B show a longitudinal section and a plan view, respectively, of a DC motor according to a first embodiment of the invention;

DETAILED DESCRIPTION OF THE INVENTION

As already mentioned, measures are taken according to the invention for a DC motor with a commutator and brushes, which result in a braking force (friction) automatically impeding the process of the brushes lifting off the commutator when the brushes are forced away by the commutator segments, and which at the same time allows the brushes to automatically slide back without any impediment in the direction of the commutator segments as soon as the process of the brushes being forced away has ended.

In order to achieve this, the brush boxes of the brushes must be positioned at an angle to the (radial) normal to the relevant commutator segment, that is to say the brush boxes are no longer positioned at right angles to the relevant commutator segment.

Thanks to the angled position of the brush boxes, the pressure from the commutator segments on the brushes results in a powerful pressure contact in the vicinity of the commutator between the brush box and the brush located in it. If the brush box is composed of an electrically highly conductive material (for example metal, in particular copper) and if the brush box is conductively connected to a corresponding current connecting pole for supplying current, a major proportion of the current is passed via the highly conductive brush box to the brush in the vicinity of the commutator. This ensures a low resistance for the current which is passed to the commutator.

Thanks to the angled positions of the brush boxes, the force which the commutator exerts on the brush pushing it away is split into two vectors. One vector forces the brush against the wall of the box and thus increases the friction between the brush and the wall or the two or more walls, while the other vector lies in the direction of the longitudinal axis of the box and thus results in the movement of the brush in the box. Owing to the wall friction, the first vector leads to constraint of the longitudinal movement and to partial destruction of the movement energy. This reduces the extent to which the brushes are lifted off the commutator. When the pressure from the commutator ceases, the brush is pressed back against the commutator by the pressure spring, but now without any damping, in order to carry the current again, immediately.

Thanks to the angled position of the brush boxes and the movement constraint associated with it, this also counteracts the radial movements of the rotor, which are thus reduced. In consequence, the rotor rotates more roundly overall.

Figure 3:
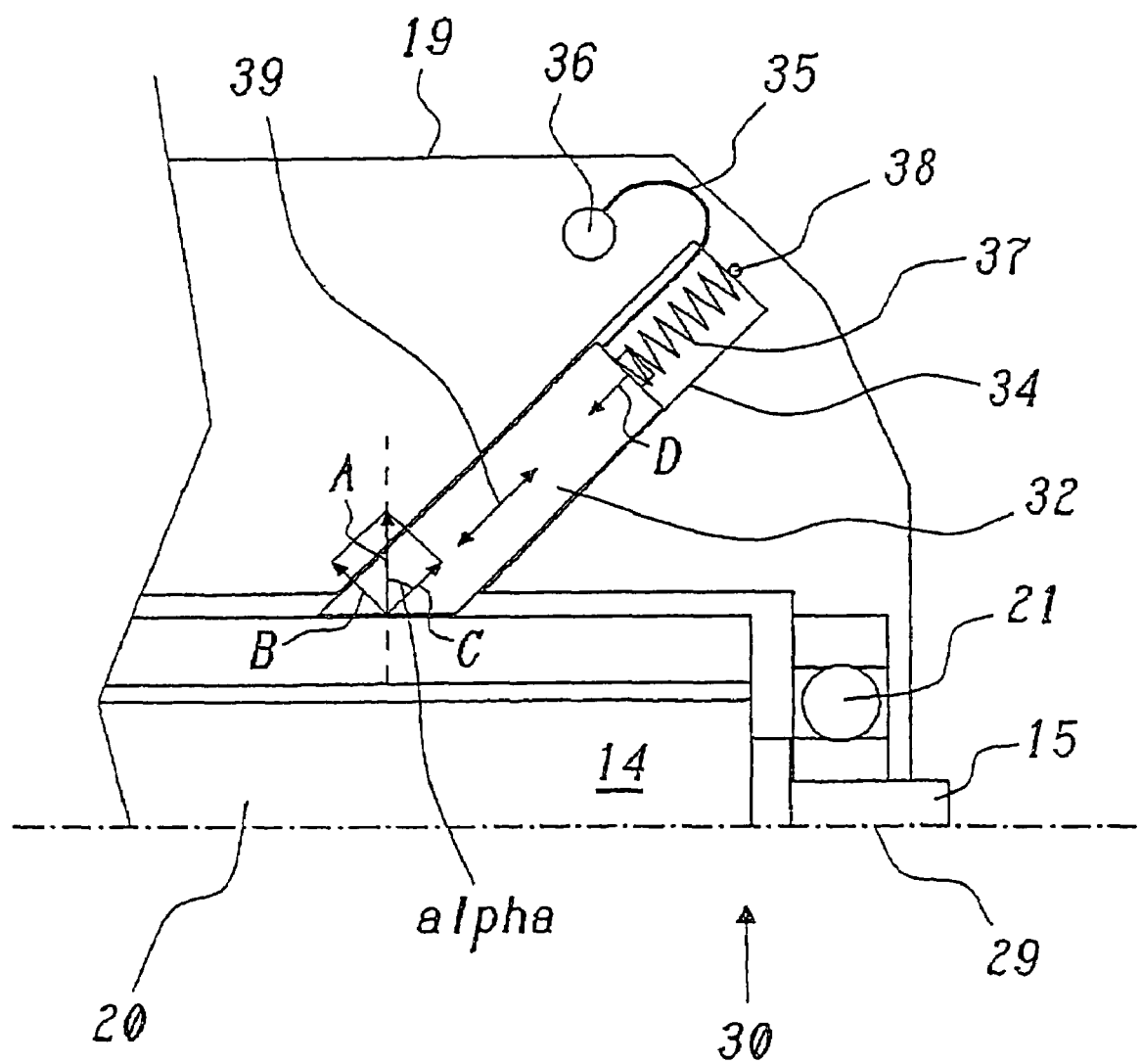
FIG. 3 shows the brush arrangement from FIG. 2A, in an enlarged detailed view.

FIGS. 2A and 2B show a DC motor according to a first embodiment of the invention, with FIG. 2A showing a longitudinal section through the motor and FIG. 2B showing a plan view in the direction of the axis. The same parts are in this case provided with the same reference symbols as in FIGS. 1A and 1B. FIG. 3 shows an enlarged detailed view of one of the brushes from FIG. 2A.

The DC motor illustrated in FIGS. 2A and 2B differs from the known motor shown in FIGS. 1A and 1B by the arrangement of the brushes 32, 33 relative to the (unchanged) commutator 14. The brushes 32, 33 are oriented with their associated brush boxes 34 obliquely outwards, so that their movement direction 39 (double-headed arrow in FIG. 3), which is predetermined by the brush boxes 34 and is the same as the direction of the force vector C in the force parallelogram shown in FIG. 3, includes an angle α (alpha) with the radial direction with respect to the axis 29, which is at the same time the direction of the normal to the commutator 14 (dashed line in the force parallelogram in FIG. 3), with this angle α being between 15° and 75°, and preferably about 45°. The two mutually opposite brushes 32, 33 in this case lie—as can be seen from FIG. 2B—on a common plane which passes through the axis 29. They can be transferred to one another by rotation through 180° about the axis 29 (rotational symmetry).

The brushes 32, 33 are pressed obliquely against the commutator segments 20 of the commutator 14 by appropriate pressure springs (spiral springs in the illustrated example) 37. The pressure springs 37 are secured in the brush boxes 34 by appropriate spring locks 38. The brushes 32, 33 are electrically connected by means of current carrying braids 35 to the current connecting poles 36. The oblique position of the brush boxes 34 and hence of the movement direction 39 allows the radial force A, which is exerted on the brush 32 by the commutator 14, to be resolved in accordance with the force parallelogram into a force C which acts parallel to the movement direction 39 and a force B which acts at right angles to the movement direction 39. This force B which acts at right angles to the wall of the brush box 34 presses the brush 32 against the wall, and thus increases the friction between the brush box 34 and the brush 32 when the brush is moving in the movement direction 39. This causes friction damping, which brakes and damps the process of the brushes lifting off the commutator 14. When the radial force A decreases, the brush 32 is pushed by the pressure spring 37 in the direction of the commutator 14 parallel to the movement direction 39, with the brush 32 being able to slide freely in the brush box 34 without being subject to any particular friction or other damping. The distance and hence the time as well for which the brush is lifted off the commutator 14 are thus reduced, thus increasing the power of the motor.

As soon as the brushes 32, 33 make contact with the commutator 14 once again, particularly when the brush boxes 34 are conductively connected to the appropriate current connecting poles 36, the current is passed through the lower part of the brush boxes 34 to the lower end of the brushes, close to the commutator. The current flows through the electrically highly conductive box walls more directly and with less resistance to the commutator 14. This also increases the power of the motor.

Figure 4:
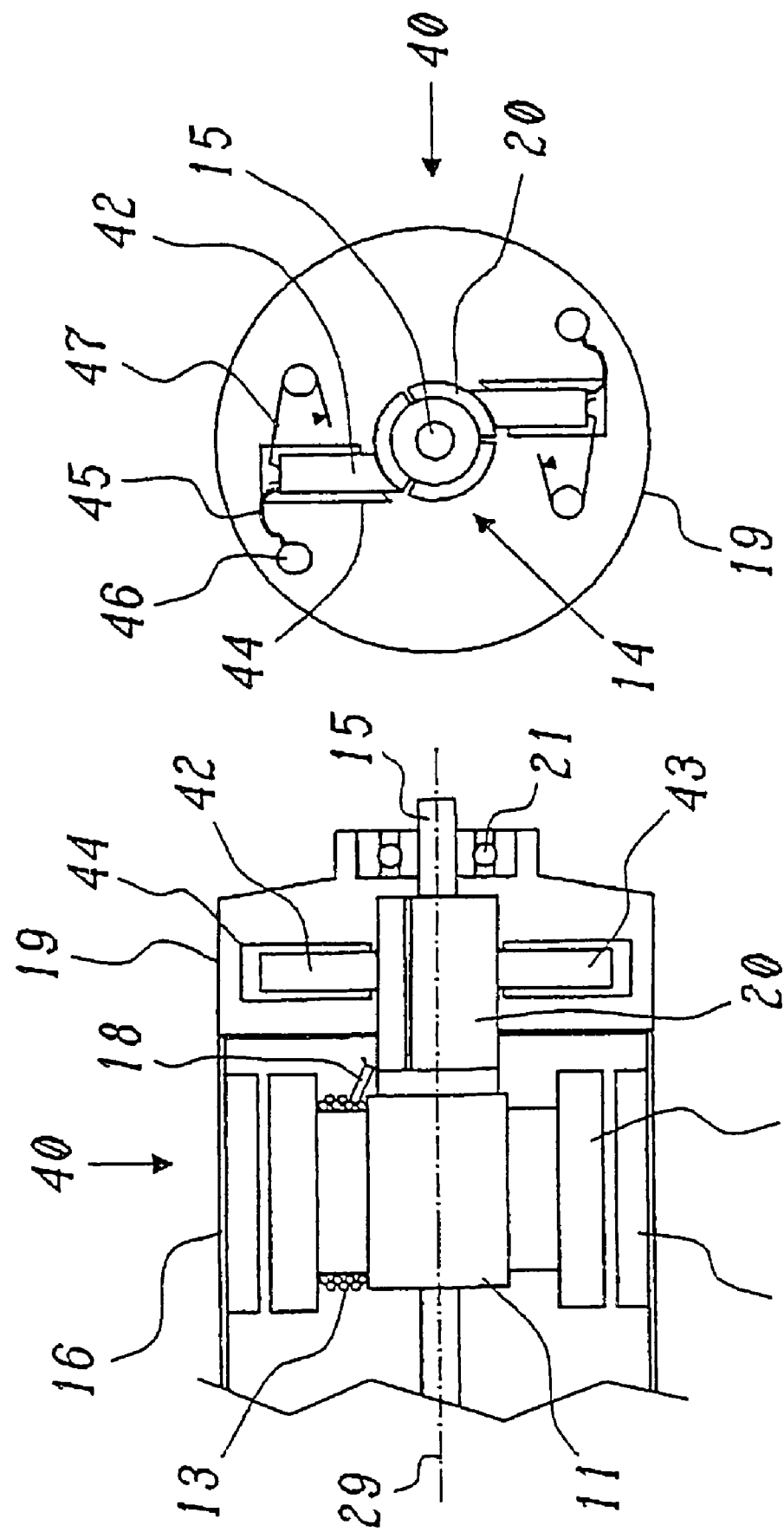
FIGS. 4A and 4B show a longitudinal section and a plan view, respectively, of a DC motor according to a second embodiment of the invention.
Figure 5:
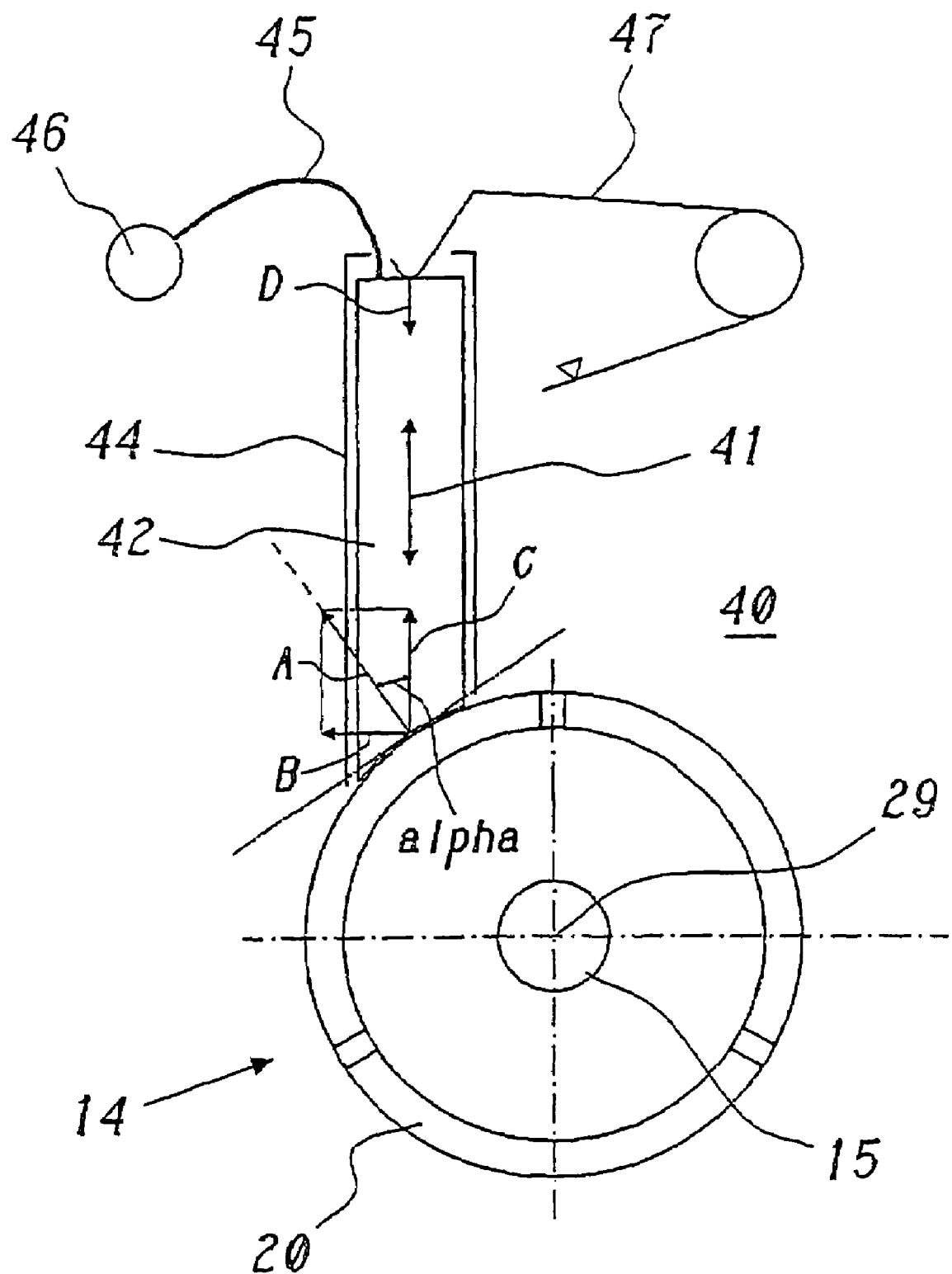
FIG. 5 shows the brush arrangement from FIG. 4B, in an enlarged detailed view.

FIGS. 4A and 4B show a DC motor 40 according to a second embodiment of the invention, with FIG. 4A showing a longitudinal section through the motor and FIG. 4B showing a plan view in the axial direction. The same parts are in this case provided with the same reference symbols as in FIGS. 1A and 1B. FIG. 5 shows an enlarged detailed view of one of the brushes from FIG. 4B.

As can be seen from FIG. 4B, the brush boxes 44 for the brushes 42, 43 no longer lie on a common plane which passes through the axis 29, but on a common plane which is at right angles to the axis 29 (see FIG. 4A). The oblique position of the movement direction 41 (FIG. 5) relative to the radial direction (the dashed line in the force parallelogram in FIG. 5) is in this case achieved by the two brushes 42, 43 being arranged laterally offset parallel in the opposite direction from the position shown in FIG. 1B. This also results in a tilt angle α, which leads to the radial force A being resolved into two mutually perpendicular forces B and C, which lead to the damping, according to the invention, of the lifting-off movement, while the return movement of the brushes is in contrast not influenced. In this situation as well, the angle α is in the range between 15° and 75°, preferably about 45°. This likewise results in the reduction of the electrical resistance for the current which is passed to the commutator 14. The brushes 42, 43 are connected in the same way via current carrying braids 45 to the current connecting poles 46. In this case, torque springs are used as the pressure springs 47. At the same time, the brush boxes 44 are conductively connected to the corresponding current connecting poles 46.

On the basis of the brush configuration that is shown in FIGS. 2A and 2B, in which the longitudinal axes of the brushes 32, 33 include an angle of about 45° with the axis 29 of the motor and lie on a common plane with the axis 29, further improvements with respect to the motor power and the thermal design of the motor can be achieved despite the highly constrained spatial conditions by using a motor head with brush boxes and brushes according to the exemplary embodiment shown in FIGS. 6A–6C and FIGS. 7A and 7B.

Figure 6A:
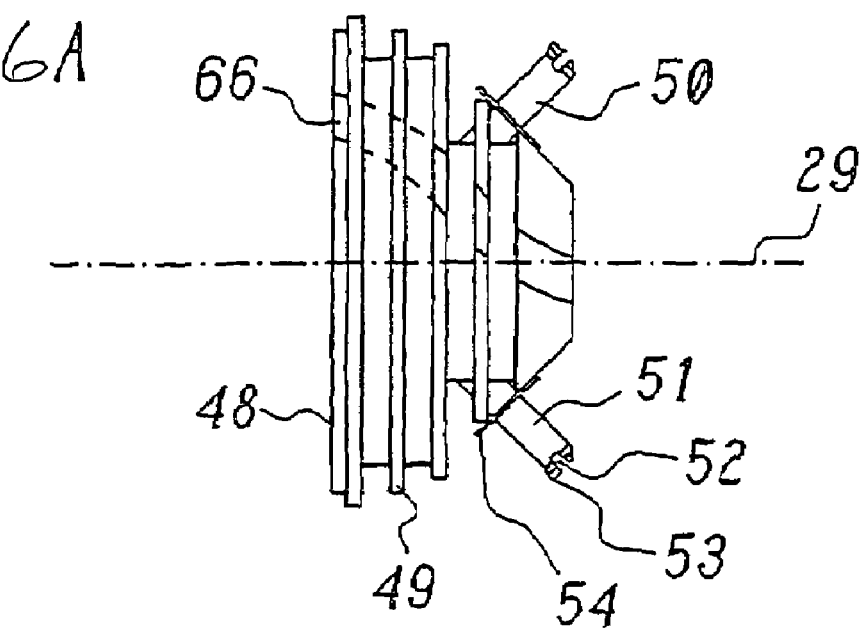
FIGS. 6A–6C show a side view, a longitudinal section through a motor head, and a plan view from above, respectively, of a brush box for a DC motor according to a third embodiment of the invention, which is distinguished by a large number of additional power-improving measures.
Figure 6B:
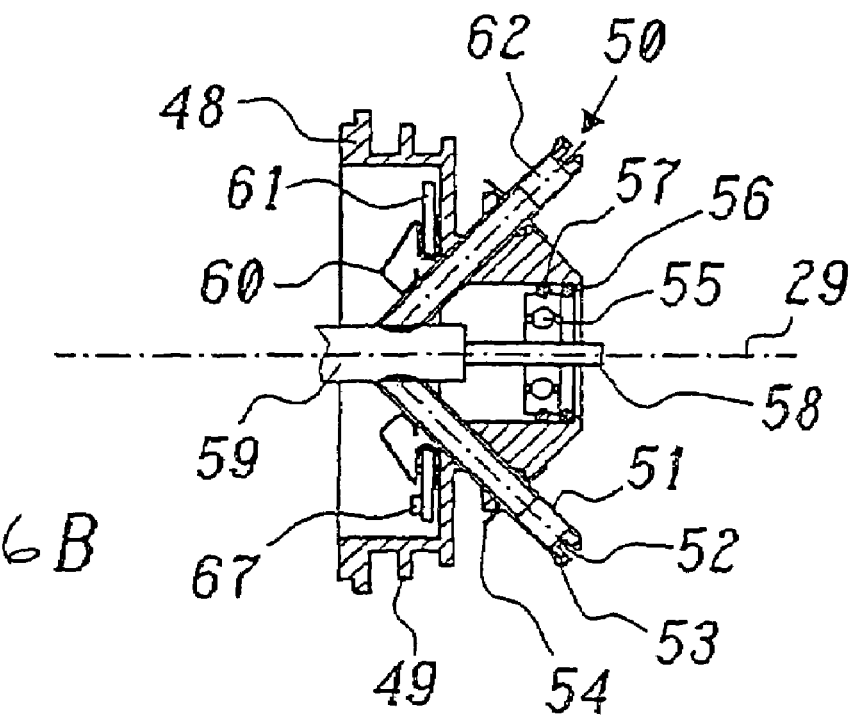
Figure 6C:
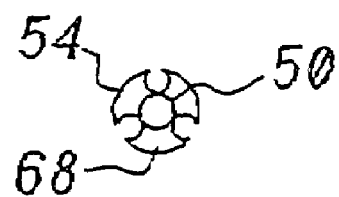

The motor head 48 shown in FIGS. 6A–6C is in the form of a shell and, for reasons of good thermal conductivity, is composed of aluminium and is provided on the outside with a number of cooling ribs 49, which are in the form of rings that are concentric about the axis 29. The cooling ribs 49 enlarge the heat transmission area between the motor head 48 and the surrounding air in a manner which is know per se.

A hole runs in the axial direction in the centre of the motor head 48 and holds a ball bearing 55 to provide the bearing for the central shaft 58 of the rotor. The ball bearing 55 is itself borne elastically in the radial and axial directions in the motor head 48 in order to allow automatically adjusting precise bearing at high rotation speeds of up to 60 000 rpm, and to minimize the brushes being knocked away as a result of non-round running. Two O rings 56, 57 are used for the elastic bearing (FIG. 6B). The one O ring 56 is seated in the axial direction between the ball bearing 55 and an undercut in the central hole in the motor head. This means that the ball bearing 55 can be supported elastically on the undercut in the axial direction. The other O ring 57 surrounds the outer shell of the ball bearing 55 concentrically, thus allowing the ball bearing to be borne elastically in the hole.

Oblique holes are provided in a corresponding manner in the motor head 48 in order to hold the tubular brush boxes 50, 51. The inner walls of these holes are anodized and thus form a thin electrical insulation layer, which electrically isolates the brush boxes 50, 51, which are inserted into the holes, from the motor head 48, but without significantly adversely affecting the good thermal contact between the brush boxes 50, 51 and the motor head 48. This ensures that the brush boxes 50, 51 can be used to supply current to the brushes (63 in FIGS. 7A and 7B) and, at the same time, that heat which is absorbed from the brushes can be emitted effectively to the motor head 48 and from there via the cooling ribs 49 to the environment. The lower ends of the brush boxes 50, 51 also continue to a point quite close to the commutator 59. This ensures that, on the one hand, current is passed with low resistance via the brush boxes 50, 51 to the tips of the brushes 63, and on the other hand that heat is dissipated directly from the tips of the brushes 63 to the motor head 48.

A further effective measure for cooling the commutator 59 and the motor head 48, in which temperatures of up to 100° C. may occur during racing operation, are ventilation channels 66 (FIG. 6A) which are milled in the motor head 48, run in a helical line and connect the interior of the motor head 48 to the environment. The rotation sense of the helical lines from the outside inwards in this case corresponds to the rotation direction of the motor. Cooling air can be sucked through the ventilation channels 66 from the outside into the interior of the motor head 48, can flow axially through the motor, and can emerge again on the opposite end face of the motor. Sucking air in in a simple manner makes it possible for the winding connections (18 in FIG. 2A) of the windings (13 in FIG. 2A) which are connected to the commutator 59 to be bent such that they act as fan vanes when the motor is running in the normal direction, forcing the air through windings in the axial direction.

Novel precautions are likewise taken on the electrical side in order to pass the current to the commutator 59 with the losses being as low as possible. In conventional racing motors, the brush boxes are conductively connected to two connecting lugs which are arranged physically separately and are used for connection of the actual power supply cable and for a regulator line. The current carrying braids (64 in FIG. 7A) which are embedded in the brushes are soldered on at a third point. This results in relatively long conduction paths, which have a disadvantageous effect at the high current levels that occur. In the exemplary embodiment shown in FIGS. 6A–6C and 7A–7B, in contrast, all the electrical cables for each pole (the power supply cable, the regulator line and the current carrying braids) are connected to the respectively brush box directly at a single point in order to produce short distances. For this purpose, each of the brush boxes 50, 51 is provided with an annular flange 54 (see also FIG. 6C), to which the lines and cables are firmly soldered, directly adjacent to the point where the brush box emerges from the motor head 48 to be outside. In order to allow the lines and cables to be soldered individually to the flange 54 without any difficulties, the flange 54 has a precisely defined thickness and is subdivided into individual sectors 68, which are thermally decoupled from one another.

By virtue of the design, the current is at each pole advantageously passed over three different paths to the tip of the brush, specifically (i) via the current carrying braid 64 and the brush 63, (ii) via the brush box 50, 51, and (iii) via the pressure spring 65 and the brush 63.

Figure 7A:
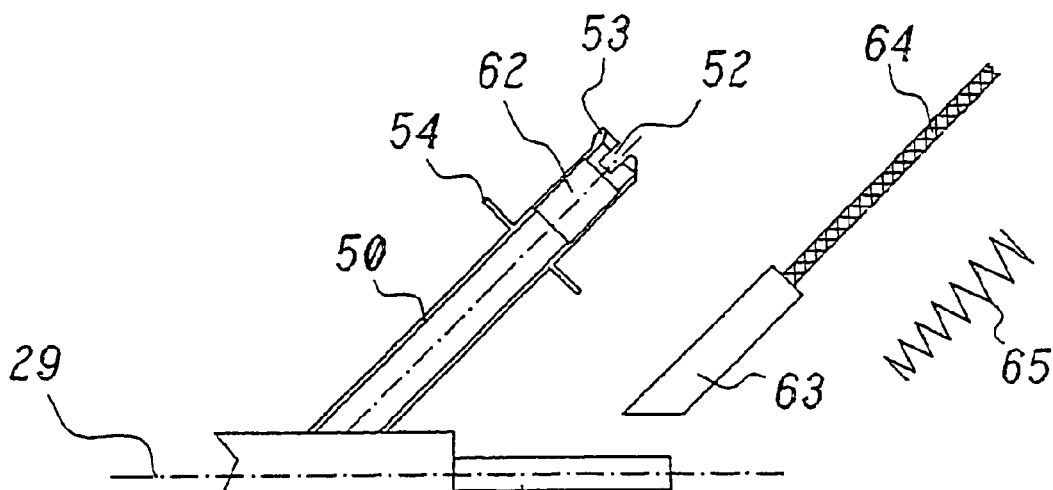
FIGS. 7A and 7B show the design and arrangement of the brushes in the motor head according to FIG. 6, in a dismantled state and in an assembled state, respectively.

In order to make it easier to install the brushes, which have to be replaced relatively frequently owing to the high degree of wear during racing operation, the brush boxes 50, 51 and the pressure springs 65 are designed in a specific manner in the exemplary embodiment shown in FIGS. 6A–6C and 7A–7B. A (widened) section 62 with an enlarged internal diameter is arranged in front of the outer end of the brush box 50, 51. The widened area forms an undercut in the brush box 50, 51, on which the outer end of the pressure spring 65 can be supported. In order to allow the pressure spring 65 to be inserted into the brush box 50, 51 from the outside, and to latch it behind the undercut, without any difficulties, it is designed such that it runs slightly conically inwards. The conical shape also prevents the pressure spring 65 from carrying out undesirable resonant oscillations. The pressure spring 65 is advantageously made of INOX wire, so that the spring constant remains largely stable over the wide temperature range that occurs. As is shown in FIG. 7A, the brush 63 is installed by pushing the pressure spring 65 over the current carrying braid 64 until its front end abuts against the brush 63. The brush 63 and the pressure spring 65 are then inserted into the brush box 50 until the outer end of the pressure spring 65 latches in on the undercut of the section

Figure 7B:
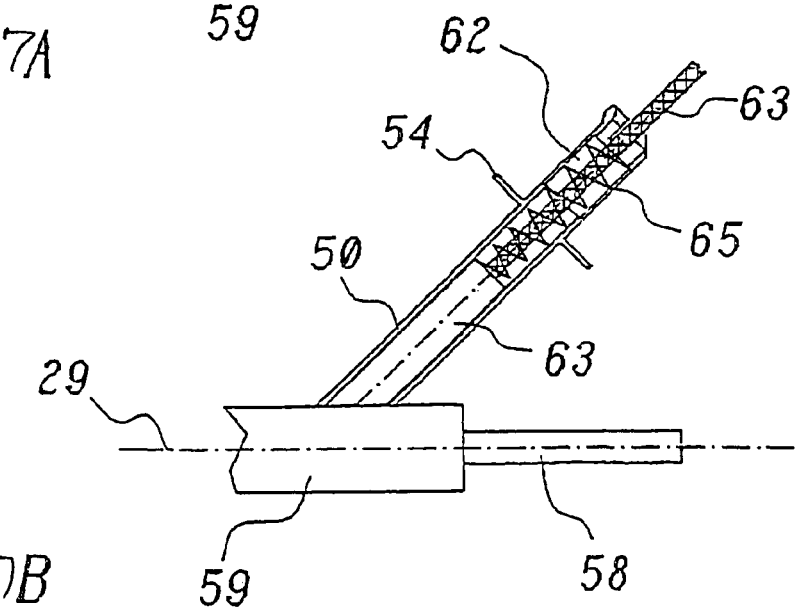

62 (FIG. 7B). Finally, the current carrying braid 64 is passed outwards through a slot 52 which is arranged at the outer end of the brush box 50, is wound a number of times around the brush box 50 underneath a collar 53 for strain relief, and is then firmly soldered to the flange 54.

The internal area which is made available by the shell-like motor head 48 can be used to accommodate means for suppression of the motor in a space-saving manner. The suppression means, which comprise capacitors, are arranged on a printed circuit board 62, which surrounds the commutator 59 in a semicircular shape. The suppression circuit is electrically connected directly via suitably bent contact springs 60, which are pushed over the edge of the circuit board 61, and press directly against the brush boxes 50, 51 such that they make contact (FIG. 6B). An externally visible light-emitting diode (LED) 67 may also be provided on the circuit board 61, with this light-emitting diode 67 being used to check the rotation direction and illuminating only when the motor is connected in the correct polarity. All of the components on the circuit board 61 are preferably in the form of SMD elements, for space reasons.

Overall, the invention is distinguished by the following characteristics and advantages:

Owing to the angled position of the brush boxes, the pressure of the commutator segments on the brushes results in a powerful contact between the brush box and the brush all the way down to the commutator. Some of the current is thus passed via the highly conductive brush box to the brush in the vicinity of the commutator, thus reducing the resistance.

Thanks to the angled position of the brush boxes, the force which the commutator may exert on the brush pushing it away is resolved into two vectors. One vector pushes the brush against at least one wall of the box, in which the brush can move corresponding to the second vector (longitudinal direction of the carbon). The friction on the wall destroys some of the energy. This makes it harder for the brushes to lift off the commutator. When the pressure from the commutator ceases, then the brush is pushed against the commutator without any damping by the normal pressure spring, in order to carry the current immediately.

The angled position of the brush boxes counteracts the radial movements of the rotor; these movements are kept small so that the commutator runs more roundly.

It is advantageous that no additional moving parts are required. The mass of the brushes must be kept as low as possible in order to keep the inertia torque low. For example, hydraulic shock absorbers are unsuitable since the weight of the moving parts would make the results worse.

The optimum position angle for the brushes may be defined to be 45°±30°.

The intensity of the damping can be adjusted by means of the position angle.

If positioned at right angles (the brush boxes are at right angles to the commutator segment; $\alpha=0$), the damping is zero. The greater the positioning angle that is set, the greater is the damping.

The invention claimed is:

1. A motor head or endbell for a DC motor having a rotor with a commutator and a motor axis, said motor head comprising:
brushes to be seated on the commutator, the brushes being mounted for movement relative to the commutator and being pushed by spring pressure onto the commutator; and
brush boxes, with each brush box configured to receive at least one brush such that it can slide in a movement direction determined by the brush box, wherein the motor head is made of a material of good thermal conductivity and each brush box is mounted in a hole or bore in the motor head in an electrically isolated manner without significantly adversely affecting good thermal contact between the brush box and the motor head wherein:
the motor head has the form of a shell;
a printed circuit board is arranged in the interior of the motor head;
the printed circuit board includes a circuit for motor suppression;
the circuit board is electrically connected to the brush boxes via contact springs which press against the brush boxes; and
an externally visible light-emitting diode is arranged on the circuit board.

2. A motor head or endbell for a DC motor having a rotor with a commutator and a motor axis, said motor head comprising:
brushes to be seated on the commutator, the brushes being mounted for movement relative to the commutator and being pushed by spring pressure onto the commutator; and
brush boxes, with each brush box configured to receive at least one brush such that it can slide in a movement direction determined by the brush box, wherein the motor head is made of a material of good thermal conductivity and each brush box is mounted in a hole or bore in the motor head in an electrically isolated manner without significantly adversely affecting good thermal contact between the brush box and the motor head, wherein:
each brush box includes means for electrically connecting lines coming from the outside to a corresponding pole; and
the means for electrically connecting includes a flange which surrounds the brush box and which is subdivided into two or more sectors.

3. A motor head or endbell for a DC motor having a rotor with a commutator and a motor axis, said motor head comprising:
brushes to be seated on the commutator, the brushes being mounted for movement relative to the commutator and being pushed by spring pressure onto the commutator; and
brush boxes, with each brush box mounted in a hole or bore in a motor head in an electrically isolated manner without significantly adversely affecting the thermal contact between the brush box and the motor head, with each brush box configured to receive at least one brush such that it can slide in a movement direction determined by the brush box, wherein the movement direction is an angle between 15° and 75° to the radial direction with respect to the axis wherein:
the motor head has the form of a shell;
a printed circuit board is arranged in the interior of the motor head;
the printed circuit board includes a circuit for motor suppression;
the circuit board is electrically connected to the brush boxes via contact springs which press against the brush boxes; and
an externally visible light-emitting diode is arranged on the circuit board.

4. A motor head or endbell for a DC motor having a rotor with a commutator and a motor axis, said motor head comprising:
  brushes to be seated on the commutator, the brushes being mounted for movement relative to the commutator and being pushed by spring pressure onto the commutator; and
  brush boxes, with each brush box mounted in a hole or bore in a motor head in an electrically isolated manner without significantly adversely affecting the thermal contact between the brush box and the motor head, with each brush box configured to receive at least one brush such that it can slide in a movement direction determined by the brush box, wherein the movement direction is an angle between 15° and 75° to the radial direction with respect to the axis wherein:
  each brush box includes means for electrically connecting lines coming from the outside to a corresponding pole; and
  the means for electrically connecting includes a flange which surrounds the brush box and which is subdivided into two or more sectors.

* * * * *

UNITED STATES PATENT AND TRADEMARK OFFICE
CERTIFICATE OF CORRECTION

PATENT NO.       : 7,218,027 B2               Page 1 of 1
APPLICATION NO. : 10/491390
DATED            : May 15, 2007
INVENTOR(S)      : Neidhart It is certified that error appears in the above-identified patent and that said Letters Patent is hereby corrected as shown below:

Title Page of the Patent, See Item (73) Assignee, "Team Orion SA, Plan-Les-Ouates (SE)" should read -- Team Orion SA, Plan-Les-Ouates (CH) --

Signed and Sealed this

Twentieth Day of November, 2007

JON W. DUDAS
*Director of the United States Patent and Trademark Office*